Oct. 26, 1954  E. N. WATERWORTH ET AL  2,692,531
STEREOSCOPIC VIEWING INSTRUMENT
Filed Oct. 25, 1951  3 Sheets-Sheet 1

INVENTORS:
Eric Newham Waterworth
and
Wilfred Thomas Robinson,
By
Their Agent.

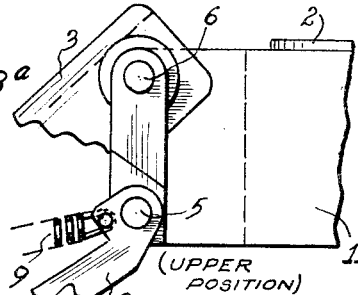
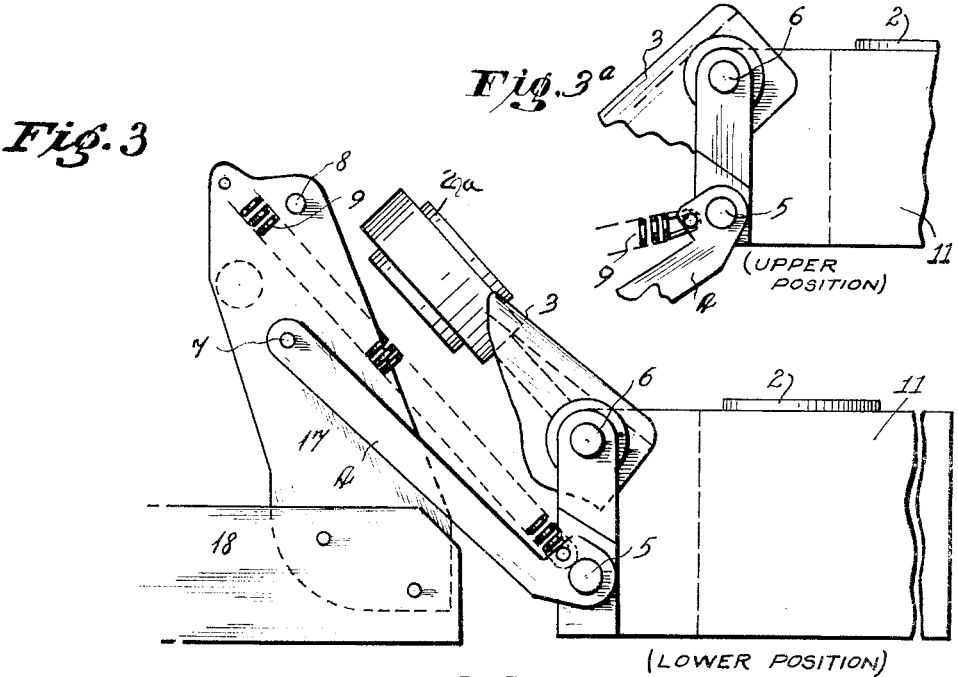
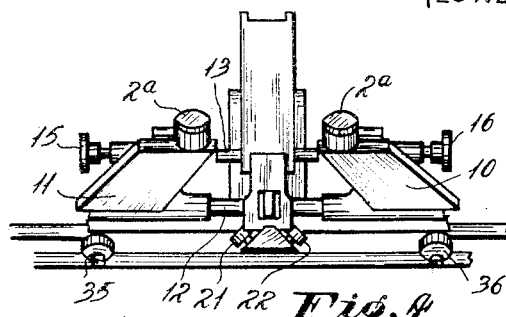
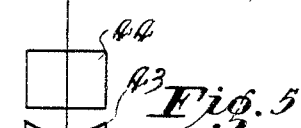
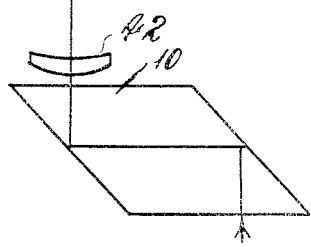

Patented Oct. 26, 1954

2,692,531

UNITED STATES PATENT OFFICE 2,692,531

STEREOSCOPIC VIEWING INSTRUMENT

Eric Newham Waterworth, Hobart, Tasmania, and Wilfred Thomas Robinson, Montrose, Tasmania, Australia Application October 25, 1951, Serial No. 253,054

3 Claims. (Cl. 88—29)

This invention relates to instruments for enabling stereoscopic viewing of pairs of photographs to be carried out, whether the photographs are transparent or opaque.

Known instruments for the above purpose employ either a pair of simple magnifying lenses, or a more complex optical arrangement of the telescope type in combination with mirrors or prisms.

Neither of the above systems is free from defects. For instance, the simple magnifying lenses impart curvature to the field of view and small magnification only is available. If the magnification is increased, the field of view and the working distance from the photographs are unduly restricted and moreover, it is necessary to overlap the stereoscopic photographs to obtain stereoscopic fusion of the two pictures.

With the telescope system in use, higher magnifications are obtainable with a flatter field of view, but the latter is unduly restricted.

The principal object of this invention is to provide an optical viewing instrument which includes improved means for viewing photographs stereoscopically, especially aerial photographs for the purposes of mapping, contouring, determination of geological formations and kindred purposes.

It is also an object of this invention to provide means for viewing pairs of photographs in such manner as to permit adequate separation between them and at the same time to provide a magnified image, a considerable flat field of view and a working distance between the optical system and the photographs sufficient to permit the marking or contouring of the photographs.

It is a feature of this invention that rolling carriages are employed to constrain movement of the optical system to rectangular axes and an eccentrically mounted roller is used to remove backlash from the roller system.

Apparatus according to this invention, is also characterized by the inclusion of a parallel link system to locate the optical system at alternative heights above the photographs but over the same portions thereof and there is also employed a spring counter-balance in the link system.

The invention is further characterized by the use of an iron table surface with which are associated permanent magnets to retain the photographs in place on the table.

Moreover, in accordance with this invention, there are employed rhomboid prisms made from a glass of refractive index substantially higher than 1.53 in order to increase the spacing between the photographs, having in mind the restriction imposed on this distance by the focal length of the high power eye piece used and the lengthening of this optical distance is proportionate to the index of refraction of the glass from which the prisms are made.

The invention is further characterized by the use of a compound objective designed to have a flat field as an eye piece for the viewing system and the use of a lens in conjunction with the flat field objective for the purpose of neutralizing the power of the low magnification lens.

In the accompanying drawings, there is illustrated in a somewhat diagrammatic manner a characteristic construction embodying the invention, and wherein:

Fig. 3 is a somewhat diagrammatic side view partly in section, of the link mechanism and spring counter-balancing means showing the optical system in the down position, while Fig. 3a is a fragmentary view indicating the optical system in the raised position.

Fig. 4 is a front perspective elevation showing the disposition of certain of the parts of the instrument and Fig. 5 is a diagrammatic illustration of the two power optical system.

Figure 1:
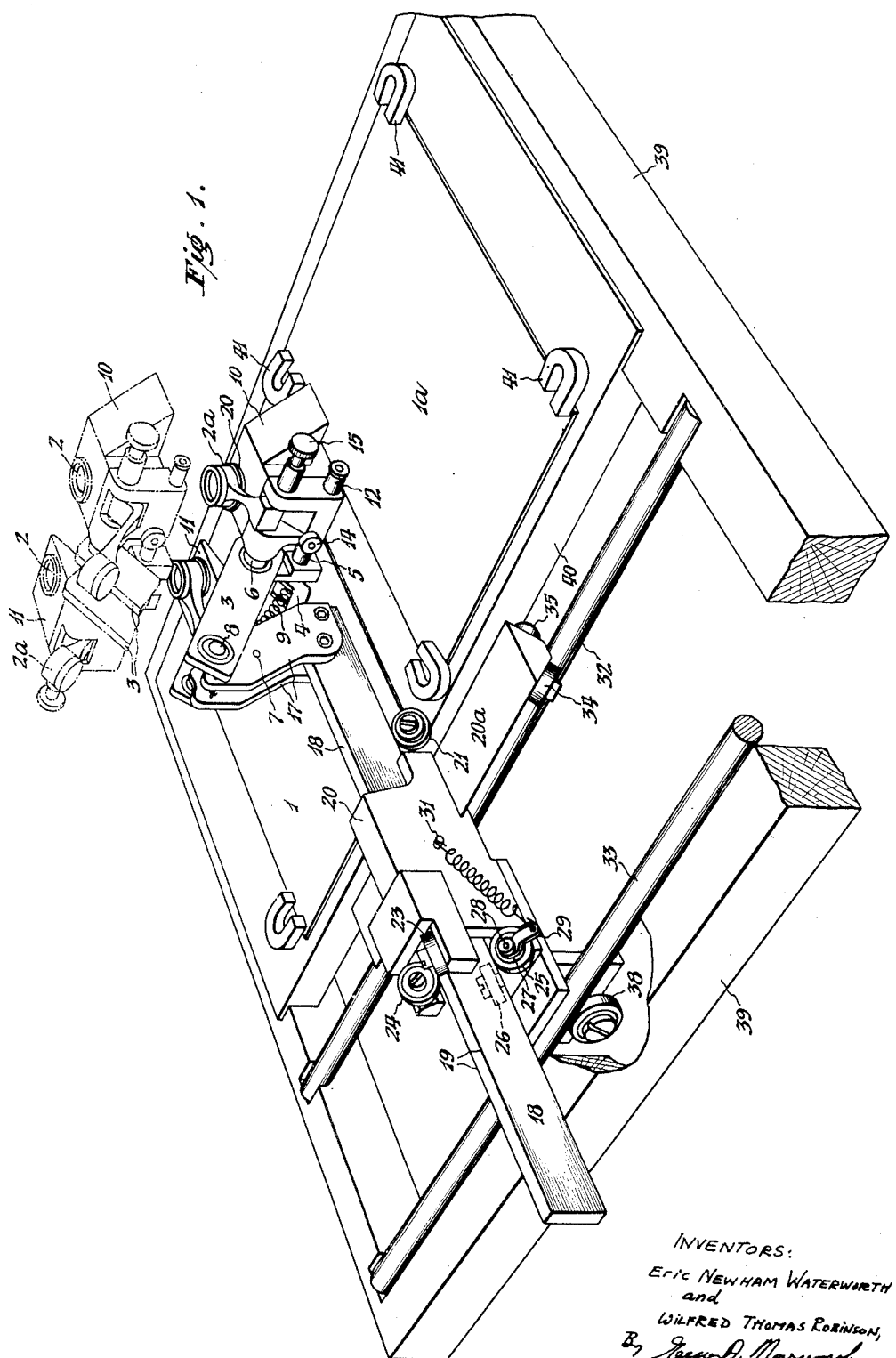
Fig. 1 is a perspective view of the instrument.

In carrying the invention into practical effect, in accordance with the exemplary construction illustrated, simple magnifying lenses are replaced with compound lens systems having flat fields of view. The lens systems of this invention are designed to have a minimum overall length and component lens diameters relative to focal length, for the purpose of achieving maximum distance between lenses and photographs while permitting sufficient magnification and adequate field of view, this latter consideration being particularly important when the flat field lenses are used in conjunction with prisms as hereinbefore described.

The said prisms are interposed between the lenses and the photographs in order to allow for increased spacing of the two photographs and consequent elimination of overlapping. It is important that the glass of the prisms have the highest possibel index of refraction, which must be considerably higher than 1.53. The lengthening of the optical distance is proportional to the index of refraction and one of the objects of this invention is attained by the use of prism glass having as high an index figure as possible.

The optical system of this invention is supported at an adjustable height above the photographs and is mounted at the end of a rectangular bar supported for back and forth movement from and to the user on rollers accurately located in a carriage capable of sidewise movement along round section bars on which also the carriage is supported on rollers.

Photographs 1 and 1a are viewed stereoscopically by the optical system comprising eye pieces and prisms suitably mounted. In the topmost position the optical magnification is approximately 1.25 and the field of view covers a considerable area of the photographs. In the lowermost position the hinged supplementary eye pieces 2a are brought into working position immediately over the fixed eye pieces and an optical magnification of approximately X3 covering a more restricted field is then available.

Accurate alignment of the optical system at right angles to the photographs is maintained by means shown clearly in Fig. 3. Therein are shown parallel links 3 and 4, the lower ends of which are pivotally mounted at 5 and 6 to the structure supporting the optical system. The upper ends of the said links are pivotally mounted to the bracket 17 at 7 and 8.

The spring 9 counter-balances the weight of the optical system when it is in the uppermost position. The optical system comprises the eye pieces 2 and prisms 10 and 11 and the assembly may be moved horizontally on round section bars 12 and 13 in order to adjust the eye piece separation to suit the pupil distance of the user. When the desired adjustment is obtained, the parts are locked in position by lock screw 14.

Supplementary eye pieces 2a are hingedly mounted and may be brought into or out of working position by rotating knobs 15 and 16 and these knobs may also be used as handles to move the instrument on its rectangular axes.

Bracket 17 is rigidly attached to the rectangular bar 18, which preferably is made of hardened steel and has its corners 19 chamfered or rounded. The bar 18 may be moved back and forth, from and to the observer on rollers which are attached to carriage 20.

The overhanging weight of the optical system and its associated linkage is taken by rollers 21, 22, 23 and 24 while rollers 25 and 26 serve to resist any tendency of the bar 18 to rotate or tilt sideways. The rectangular bar 18 is therefore constrained in every direction except for the back and forth movement from and to the user.

The rollers of each pair are mounted at 90 degrees to one another and their faces bear on the corners of the rectangular bar 18. All the rollers, with the exception of roller 25, are fixed to carriage 20 and roller 25 rotates on a bush 27 which is eccentrically mounted on pivot 28.

A lever 29 is attached to the bush 27 and a spring 30 is anchored to the end of lever 29 and to the carriage 20 at 31.

The bush and pivot 28 are adjusted during assembly of the instrument so that, under the influence of spring 30, roller 25 bears against the edge of bar 18 and drives its other three edges firmly against the rollers 23, 24 and 26. Any backlash from the location provided by these rollers to the bar 18, resulting from inaccuracies in manufacture, is removed by this arrangement.

Carriage 20 is located on round section bars 32 and 33 by means of rollers 34, 35, 36 and 37 mounted below a platform 20a which forms part of the carriage 20. A roller 38 is provided to resist rotational movement about bar 32 which would be caused by the weight of the overhanging optical system. The rollers 34, 35, 36 and 37 constrain the carriage 20 to move in parallelism with the bars 32 and 33.

The bars 32 and 33 are rigidly attached to a base frame 39 to which is secured a flat iron plate 40 on which are placed the photographs to be viewed. After adjustment for alignment and correct separation, the photographs are held firmly on the iron plate by means of permanent magnets 41.

Figure 2:
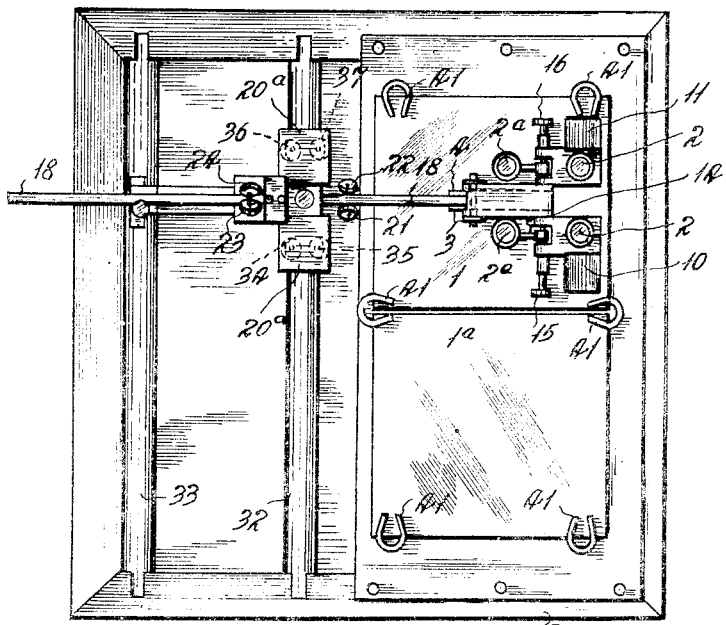
Fig. 2 is a plan view projected from Fig. 1.

The optical system is represented in Fig. 5, and it consists of a pair of rhomboid prisms which are indicated by the reference numerals 10 and 11 in Fig. 2, together with a simple positive meniscus eye lens associated with each prism. One half of the optical system is shown in Fig. 5 and it will be understood that the simple positive meniscus eye lens 42 is used in the case of the low power system. The high power eye pieces used in conjunction with the same prisms, consist of compound objectives having flat fields and a photographic type of objective of good design, conforms to these requirements.

To avoid the necessity of removing the meniscus lens 42 before bringing the high power eye piece into working position, a negative meniscus lens is mounted below the high power objective for the purpose of neutralizing the power of lens 42.

By this means, the power and optical correction of the high power lens are unaffected by lens 42. In Fig. 5, the negative meniscus lens is represented by 43 and the high power eye piece by 44. When the lenses 43 and 44 are in working position, the two lenses are almost in contact.

In practice, the construction of the instrument provides for the use of interchangeable lens systems whereby the magnification and field of view may be changed at will and in an alternative construction, it is contemplated to provide two or more complete optical systems mounted so as to be brought separately into operative position, as and when desired.

It will also be understood that other changes and modifications may be made within the ambit of the invention.

We claim:

1. A stereoscopic viewing device which includes a base frame, a table thereon to support a pair of photographs, means to retain the photographs in position, an optical system arranged and mounted to permit adequate magnified viewing of the said photographs, fixed eye pieces associated with rhomboid prisms, supplementary eye pieces arranged to co-operate with the said fixed eye pieces, compound objectives in the optical system, said compound objectives having flat fields and acting as eye pieces, lenses for neutralizing the power of the low magnification lens of the fixed eye pieces at the appropriate times, rolling carriages to constrain movement of the optical system to rectangular axes, a horizontal bar along which the optical system is capable of movement parallel with the said table to and from the observer, a pair of parallel bars of round section arranged in spaced apart relationship and along which the optical system may be moved transversely, said horizontal bar being mounted on a carriage fitted with rollers in contact with the said round bars, and said horizontal bar being arranged to run between rollers fitted to the said carriage to permit back and forth movement.

2. A stereoscopic viewing device, as claimed in claim 1, said table including a magnetizable material, and said retaining means comprising permanent magnets attracted towards said magnetizable material.

3. In a stereoscopic viewing device, as claimed in claim 1, a guide for said supplementary eye pieces operable to guide the latter between an active position in optical registry with said fixed eye pieces and, respectively, an inactive position away therefrom.

References Cited in the file of this patent

UNITED STATES PATENTS

| Number | Name | Date |
|---|---|---|
| 1,494,728 | Beyerlen | May 20, 1924 |
| 1,693,527 | Reeves | Nov. 27, 1928 |
| 1,865,683 | Edstrom | July 5, 1932 |
| 1,911,963 | Morrison | May 30, 1933 |
| 2,229,309 | Ryker | Jan. 21, 1941 |
| 2,410,725 | Franklin | Nov. 5, 1946 |

FOREIGN PATENTS

| Number | Country | Date |
|---|---|---|
| 15,398 | Great Britain | of 1906 |
| 540,700 | Great Britain | Oct. 27, 1941 |
| 878,372 | France | Oct. 5, 1942 |
| 707,499 | Germany | June 24, 1941 |